United States Patent
Cring (10) Patent No.: US 7,611,441 B2
(45) Date of Patent: Nov. 3, 2009

(54) TORQUE TRANSFER CONTROL SYSTEM FOR POWER TRANSMISSION DEVICE IN A MOTOR VEHICLE

(75) Inventor: Brent A. Cring, Cleveland, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

(21) Appl. No.: 12/263,824

(22) Filed: Nov. 3, 2008

(65) Prior Publication Data

US 2009/0062071 A1 Mar. 5, 2009

Related U.S. Application Data

(63) Continuation of application No. 11/507,819, filed on Aug. 22, 2006, now Pat. No. 7,445,581, which is a continuation of application No. 10/703,381, filed on Nov. 7, 2003, now Pat. No. 7,125,364.

(51) Int. Cl.
*B60W 10/02* (2006.01)
*B60W 10/04* (2006.01)
*G06F 7/00* (2006.01)
*G06F 17/00* (2006.01)

(52) U.S. Cl. .................. 477/174; 477/180; 701/67; 701/69

(58) Field of Classification Search ............... 477/174, 477/180; 701/67, 69
See application file for complete search history.

(56) References Cited

U.S. PATENT DOCUMENTS

| | | | |
|---|---|---|---|
| 4,895,236 A | 1/1990 | Sakakibara et al. | |
| 5,002,147 A | 3/1991 | Tezuka et al. | |
| 5,270,930 A * | 12/1993 | Ito et al. | ........................ 701/69 |
| 5,323,871 A | 6/1994 | Wilson et al. | |
| 5,330,030 A | 7/1994 | Eastman et al. | |
| 5,363,938 A | 11/1994 | Wilson et al. | |
| 5,407,024 A | 4/1995 | Watson et al. | |
| 5,423,235 A | 6/1995 | Botterill et al. | |
| 6,564,139 B2 * | 5/2003 | Sakakiyama | ................. 701/89 |
| 6,567,749 B2 | 5/2003 | Matsuura | |
| 6,697,725 B1 | 2/2004 | Williams | |
| 6,808,037 B1 | 10/2004 | Mueller | |

FOREIGN PATENT DOCUMENTS

| | | |
|---|---|---|
| DE | 3908478 A1 | 10/1989 |
| JP | 3066927 | 3/1988 |
| JP | 2018117 | 1/1990 |

\* cited by examiner

*Primary Examiner*—Tisha D Lewis
(74) *Attorney, Agent, or Firm*—Harness, Dickey & Pierce, P.L.C.

(57) ABSTRACT

A torque transfer mechanism includes a multi-plate clutch assembly that is operably disposed between a first rotary and a second rotary member. A control system determines a desired quantity of torque to deliver to the second rotary member and controls the clutch to produce the desired torque.

10 Claims, 7 Drawing Sheets

| TRANSMISSION GEAR | TRANSMISSION GEAR RATIO |
|---|---|
| 1 | 3.06 = TGR |
| 2 | 1.60 = TGR |
| 3 | 1.00 = TGR |
| 4 | 0.7 = TGR |
| R | 2.29 = TGR |

FIG. - 4

| TORQUE CONVERTER SPEED RATIO | TORQUE CONVERTER TORQUE RATIO |
|---|---|
| TCSR = 0.00 | 1.99 = TCTR |
| 0 <TCSR< 0.13 | 1.86 = TCTR |
| 0.13 <TCSR< 0.26 | 1.75 = TCTR |
| 0.26 <TCSR< 0.39 | 1.61 = TCTR |
| 0.39 <TCSR< 0.52 | 1.46 = TCTR |
| 0.52 <TCSR< 0.64 | 1.31 = TCTR |
| 0.64 <TCSR< 0.73 | 1.18 = TCTR |
| 0.73 <TCSR< 0.77 | 1.13 = TCTR |
| 0.77 <TCSR< 0.81 | 1.08 = TCTR |
| 0.81 <TCSR< 0.84 | 1.04 = TCTR |
| 0.84 <TCSR< 5.00 | 1.00 = TCTR |

FIG. - 5

| TRANSFER CASE DESIRED TORQUE | CLUTCH ACTUATOR POSITION |
|---|---|
| 30 <TCTD< 92 | 10 = CAP |
| 92 <TCTD< 154 | 9 = CAP |
| 154 <TCTD< 216 | 8 = CAP |
| 216 <TCTD< 278 | 7 = CAP |
| 278 <TCTD< 340 | 6 = CAP |
| 340 <TCTD< 402 | 5 = CAP |
| 402 <TCTD< 464 | 4 = CAP |
| 464 <TCTD< 526 | 3 = CAP |
| 526 <TCTD< 588 | 2 = CAP |
| 588 <TCTD< 650 | 1 = CAP |
| 650 <TCTD | 0 - CAP |

FIG. - 6

| STEER ANGLE | STEER ANGLE OFFSET |
|---|---|
| 0 <=SA< 5 | 0 = SO |
| 5 <SA< 180 | 1 = SO |
| 180 <SA< 255 | 2 = SO |
| 255 <SA | 5 = SO |

TORQUE TRANSFER CONTROL SYSTEM FOR POWER TRANSMISSION DEVICE IN A MOTOR VEHICLE

CROSS-REFERENCE

This application is a continuation of U.S. patent application Ser. No. 11/507,819 filed on Aug. 22, 2006, which is a continuation of U.S. patent application Ser. No. 10/703,381 filed Nov. 7, 2003, now U.S. Pat. No. 7,125,364. The disclosures of the above applications are incorporated herein by reference.

FIELD OF THE INVENTION

The present invention relates generally to power transfer systems for controlling the distribution of drive torque between the front and rear drivelines of a four-wheel drive vehicle. More particularly, the present invention is directed to a power transmission device having a torque transfer mechanism equipped with a friction clutch, a power-operated clutch actuator, and a control system employing an active torque control strategy for controlling actuation of the power-operated clutch actuator.

BACKGROUND OF THE INVENTION

In view of increased demand for four-wheel drive vehicles, many different power transfer systems are currently being incorporated into vehicular driveline applications for transferring drive torque to the wheels. In some vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism may include a dog-type lock-up clutch that can be selectively engaged for rigidly coupling the secondary driveline to the primary driveline to establish a locked or "part-time" four-wheel drive mode. In contrast, drive torque is only delivered to the primary driveline when the lock-up clutch is released for establishing a two-wheel drive mode.

A modern trend in four-wheel drive motor vehicles is to equip the power transmission device with a transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the multi-plate clutch assembly. In passive-type transfer clutch applications, the clutch actuator generates the clutch engagement force in response to the magnitude of the speed difference between the primary and secondary wheels. In active-type applications, however, the clutch actuator includes a power-operated device that is actuated in response to electric control signals sent from an electronic control unit (ECU). The ECU receives input signals from speed sensors associated with the primary and secondary drivelines as well as from other vehicle sensors and generates the control signal based thereon. Thus, such "on-demand" power transmission devices can automatically respond to slip conditions which occur during different types of driving situations and road conditions.

A large number of on-demand power transmission devices have been developed with an electrically-controlled clutch actuator that can regulate the amount of drive torque transferred to the secondary driveline as a function of the value of the electrical control signal applied thereto. In some applications, the transfer clutch employs an electromagnetic clutch as the power-operated clutch actuator. For example, U.S. Pat. No. 5,407,024 discloses an electromagnetic coil that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic actuator for directly controlling actuation of the multi-plate clutch pack assembly.

As an alternative, the transfer clutch can employ an electric motor and a drive assembly as its power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm that is operable for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

As noted, conventional on-demand power transmission devices typically operate in the two-wheel drive mode and are adaptively shifted into the four-wheel drive mode in response to lost traction at the primary wheels. In contrast, "full-time" power transmission devices utilize a center or interaxle differential between the primary and secondary drivelines to continuously transfer drive torque therebetween while also accommodating speed differentiation between the drivelines. To minimize loss of traction due to wheel slippage, many full-time power transmission devices are also equipped with a biasing clutch for limiting interaxle slip and varying the distribution ratio of the drive torque transmitted across the interaxle differential to the primary and secondary drivelines. Like the on-demand transfer clutch, many biasing clutches include a multi-plate clutch assembly and a power-operated clutch actuator that is adaptively controlled by a control system to vary engagement of the clutch assembly.

While many power-operated clutch actuation systems similar to those described above are currently used in on-demand and full-time four-wheel drive vehicles, a need exists to advance the technology and address recognized system limitations. In an effort to address such concerns, new technologies are being considered for use in vehicle control applications.

SUMMARY OF THE INVENTION

Thus, it is an object of the present invention to provide a power transfer system for controlling the distribution of drive torque between the front and rear drivelines of a motor vehicle to establish a full-time four-wheel drive mode of operation.

As a related object, the power transfer system of the present invention includes a power transmission device having a torque transfer mechanism equipped with a multi-plate clutch assembly operably installed between the front and rear drivelines, power-operated clutch actuator, and a control system using a strategy for providing active full-time torque control.

An additional object of the present invention is to adaptively control actuation of the power-operated clutch actuator using the full-time torque control strategy to maintain a predetermined torque distribution ratio between the front and rear drivelines without the use of an interaxle differential assembly.

According to one preferred embodiment, the power transfer system includes a transfer case for use in a four-wheel drive motor vehicle having a powertrain and first and second drivelines, and a control system utilizing an active full-time torque control strategy. The transfer case includes a first shaft driven by the powertrain and which is adapted for connection to the first driveline, a second shaft adapted for connection to the second driveline, and a torque transfer mechanism. The torque transfer mechanism includes a friction clutch operably disposed between the first shaft and the second shaft, and a power-operated clutch actuator for generating and applying a clutch engagement force on the friction clutch. The control system includes vehicle sensors and a controller to control actuation of the clutch actuator. Pursuant to the active full-time torque control strategy, the controller uses signals from the various vehicle sensors to calculate a desired or "targeted" torque value to be transferred through the friction clutch to the second shaft for maintaining the predetermined front/rear torque distribution ratio. The controller generates a control signal based on the targeted torque value. The controller thereafter delivers the control signal to the power-operated clutch actuator for engaging the friction clutch.

According to another embodiment of a power transmission device, a coupling assembly is equipped with the torque transfer mechanism for automatically transferring drive torque from the first driveline to the second driveline utilizing the active full-time torque control strategy of the present invention.

According to yet another embodiment of a power transmission device, the torque transfer mechanism is operably associated with a power transfer unit for automatically transferring drive torque from the first driveline to the second driveline.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a power transfer system utilizing a torque control strategy for adaptively controlling actuation of a torque transfer mechanism for controlling the drive torque transferred from a first rotary member to a second rotary member. The torque transfer mechanism finds particular application in power transmission devices for use in four-wheel drive motor vehicles such as, for example, a transfer clutch in a transfer case, a power take-off unit, or an in-line torque coupling. Thus, while the present invention is hereinafter described in association with particular arrangements for use in specific driveline applications, it will be understood that the arrangements shown and described are merely intended to illustrate embodiments of the present invention.

Figure 1:
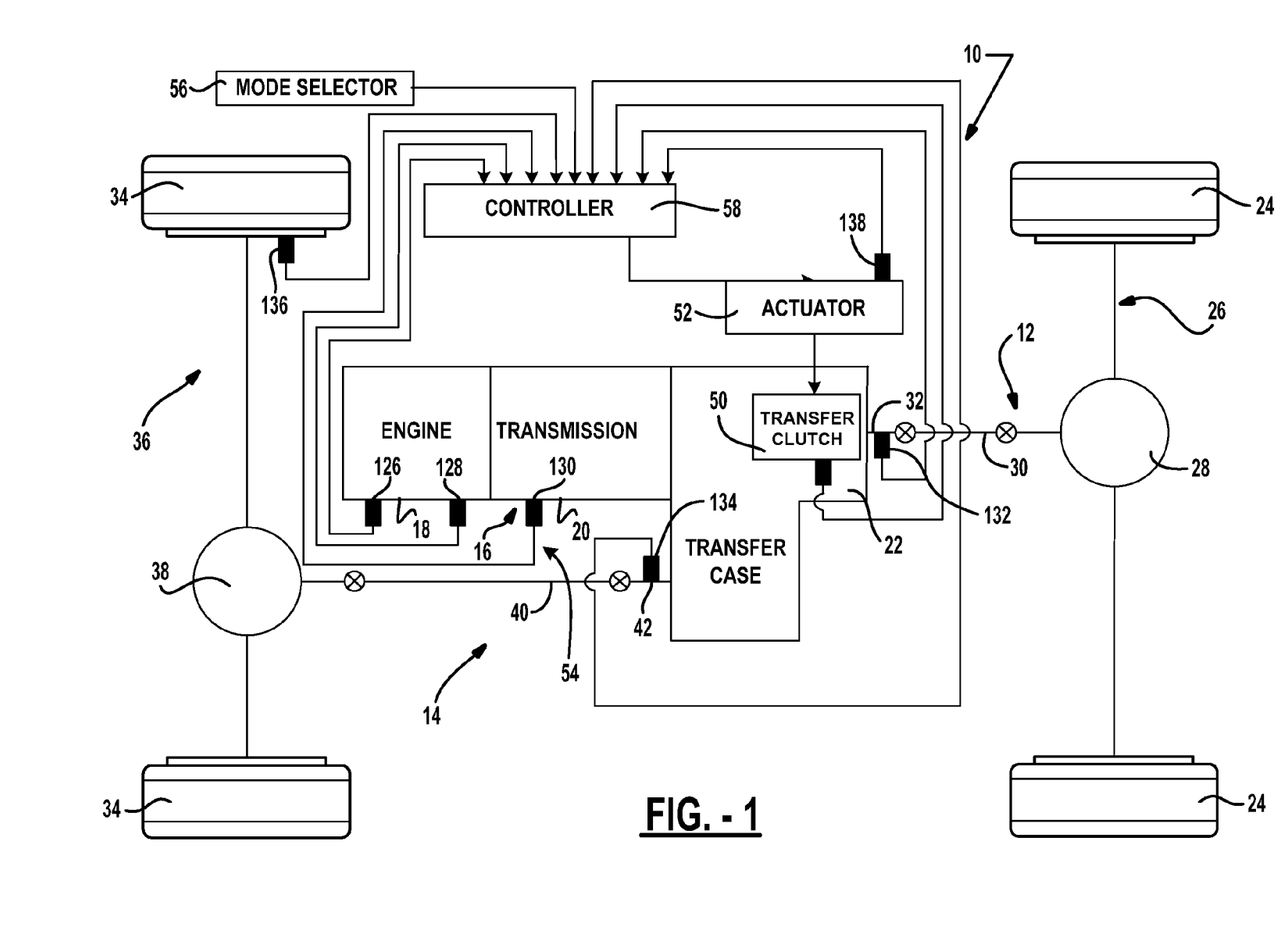
FIG. 1 illustrates the drivetrain of a four-wheel drive vehicle equipped with the power transmission device of the present invention.

With particular reference to FIG. 1 of the drawings, a drivetrain 10 for a four-wheel drive vehicle is shown. Drivetrain 10 includes a first driveline 12, a second driveline 14, and a powertrain 16 for delivering rotary tractive power (i.e., drive torque) to the first and second drivelines. In the particular arrangement shown, first driveline 12 is the rear driveline while second driveline 14 is the front driveline. Powertrain 16 includes an engine 18, a multi-speed transmission 20, and a power transmission device, hereinafter referred to as transfer case 22. Rear driveline 12 includes a pair of rear wheels 24 connected at opposite ends of a rear axle assembly 26 having a rear differential 28 coupled to one end of a rear propshaft 30, the opposite end of which is coupled to a rear output shaft 32 of transfer case 22. Likewise, front driveline 14 includes a pair of front wheels 34 connected at opposite ends of a front axle assembly 36 having a front differential 38 coupled to one end of a front propshaft 40, the opposite end of which is coupled to a front output shaft 42 of transfer case 22.

With continued reference to the drawings, drivetrain 10 is shown to further include an electronically-controlled power transfer system for adaptively controlling the torque distribution between the front and rear drivelines. In this regard, transfer case 22 is equipped with a transfer clutch 50 that can be selectively engaged for transferring drive torque from rear output shaft 32 to front output shaft 42. The power transfer system further includes a power-operated clutch actuator 52 for actuating transfer clutch 50, and a control system having vehicle sensors 54 for detecting certain dynamic and operational characteristics of the motor vehicle, a mode selector 56 permitting the vehicle operator to select one of the available drive modes, and a controller 58 for controlling actuation of clutch actuator 52 in response to input signals from vehicle sensors 54 and mode selector 56.

It is contemplated that as many as three different operative drive modes could be made available for selection via mode selector 56. First, a two-wheel drive (2WD) mode is established when transfer clutch 50 is released such that drive torque is only transmitted from powertrain 16 to rear driveline 12. Next, a locked or part-time four-wheel drive (4WD) mode is established when transfer clutch 50 is fully engaged such that drive torque is transmitted equally to both drivelines. Finally, an all-wheel drive (AWD) mode is established when power-operated clutch actuator 52 is adaptively controlled for controlling engagement of transfer clutch 50. As will be detailed, an active full-time torque control strategy is utilized by the control system when the AWD mode is selected. This control strategy is intended to mimic operation of an interaxle differential by maintaining a predetermined torque distribution ratio between the front and rear drivelines.

Figure 2:
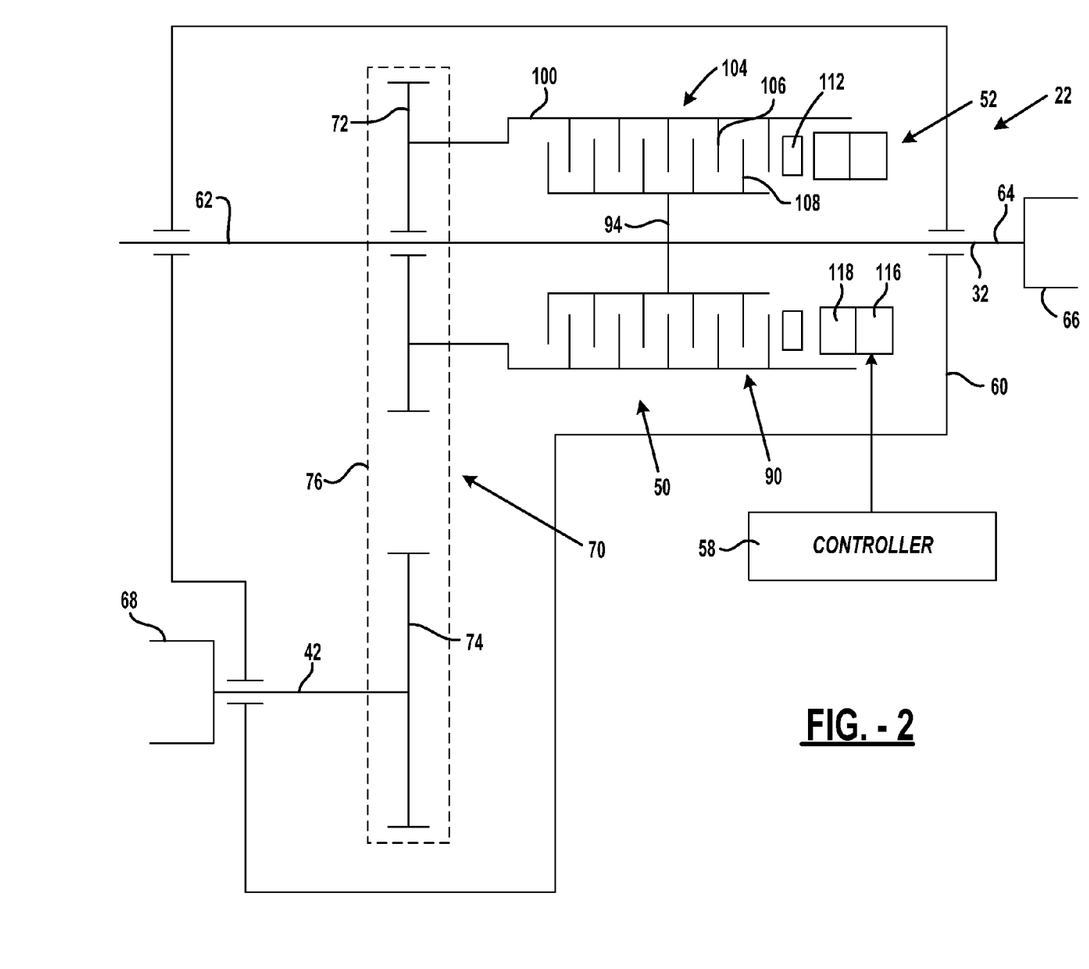
FIG. 2 is a sectional view of a transfer case associated with the drivetrain shown in FIG. 1 and which is equipped with a torque transfer mechanism according to the present invention.

Transfer case 22 is schematically shown in FIG. 2 to include a housing 60 from which rear output shaft 32 is rotatably supported. Rear output shaft 32 includes a first end segment 62 adapted for connection to the output shaft of transmission 20 and a second end segment 64 to which a yoke 66 is secured for connection to rear propshaft 30. Front output shaft 42 is likewise rotatably supported in housing 60 and includes a yoke segment 68 adapted for connection to front propshaft 40.

Transfer clutch 50 is operably arranged to transfer rotary power (i.e., drive torque) from rear output shaft 32 to front output shaft 42 through a transfer assembly 70. Transfer assembly 70 includes a first sprocket 72, a second sprocket 74, and a power chain 76 that is in driving engagement with first sprocket 72 and second sprocket 74. First sprocket 72 is rotatably supported on rear output shaft 32 while second sprocket 74 is coupled for rotation with front output shaft 42. Transfer clutch 50 includes a multi-plate friction clutch assembly 90. Clutch assembly 90 is shown to include a clutch hub 94 fixed for rotation with rear output shaft 32, a clutch drum 100 fixed for rotation with first sprocket 72, and a multi-plate clutch pack 104 operably disposed between hub 94 and drum 100. Clutch pack 104 includes a set of outer clutch plates 106 that are splined for rotation with and axial movement on drum 100. Clutch pack 104 also includes a set of inner clutch plates 108 that are splined for rotation with and axial movement on clutch hub 94.

Clutch assembly 90 also includes a pressure plate 112 arranged to exert a compressive clutch engagement force on clutch pack 104. Pressure plate 112 is axially moveable relative to clutch pack 104 through a range of travel defined between a first or "released" position and a second or "locked" position. With pressure plate 112 in its released position, a minimum clutch engagement force is exerted on clutch pack 104 such that virtually no drive torque is transferred from rear output shaft 32 through clutch assembly 90 and transfer assembly 70 to front output shaft 42, thereby establishing the 2WD mode. In contrast, location of pressure plate 112 in its locked position causes a maximum clutch engagement force to be applied to clutch pack 104 such that front output shaft 42 is, in effect, coupled for common rotation with rear output shaft 32, thereby establishing the 4WD mode. Accurate control of the position of pressure plate 112 between its released and locked positions permits adaptive regulation of the amount of drive torque transferred from rear output shaft 32 to front output shaft 42, thereby establishing the adaptive AWD mode.

Clutch actuator 52 is provided for moving pressure plate 112 between its released and locked positions. While only a schematic version of actuator 52 is depicted in the drawings, one skilled in the art will appreciate that many types of power-operated actuator devices may be controlled using the torque control strategy of the present invention. Preferably, clutch actuator 52 includes a power unit 116 and an apply operator device 118. Power unit 116 is adapted to receive electric control signals from controller 58 and generate an output force or torque in response thereto. A preferred power unit 116 is an electric motor having a rotary output. Apply operator device 118 is adapted to convert and amplify the output of power unit 116 into a linear thrust force that is applied to pressure plate 112 for causing movement thereof between its released and locked positions. Examples of suitable apply operator devices include ball ramps, ball screws, sector-driven pivoting lever systems, and other similar devices. One example of a suitable clutch actuator 52 is shown and described in commonly-owned U.S. Pat. No. 6,484,857 which is hereby incorporated by reference.

Figure 3:
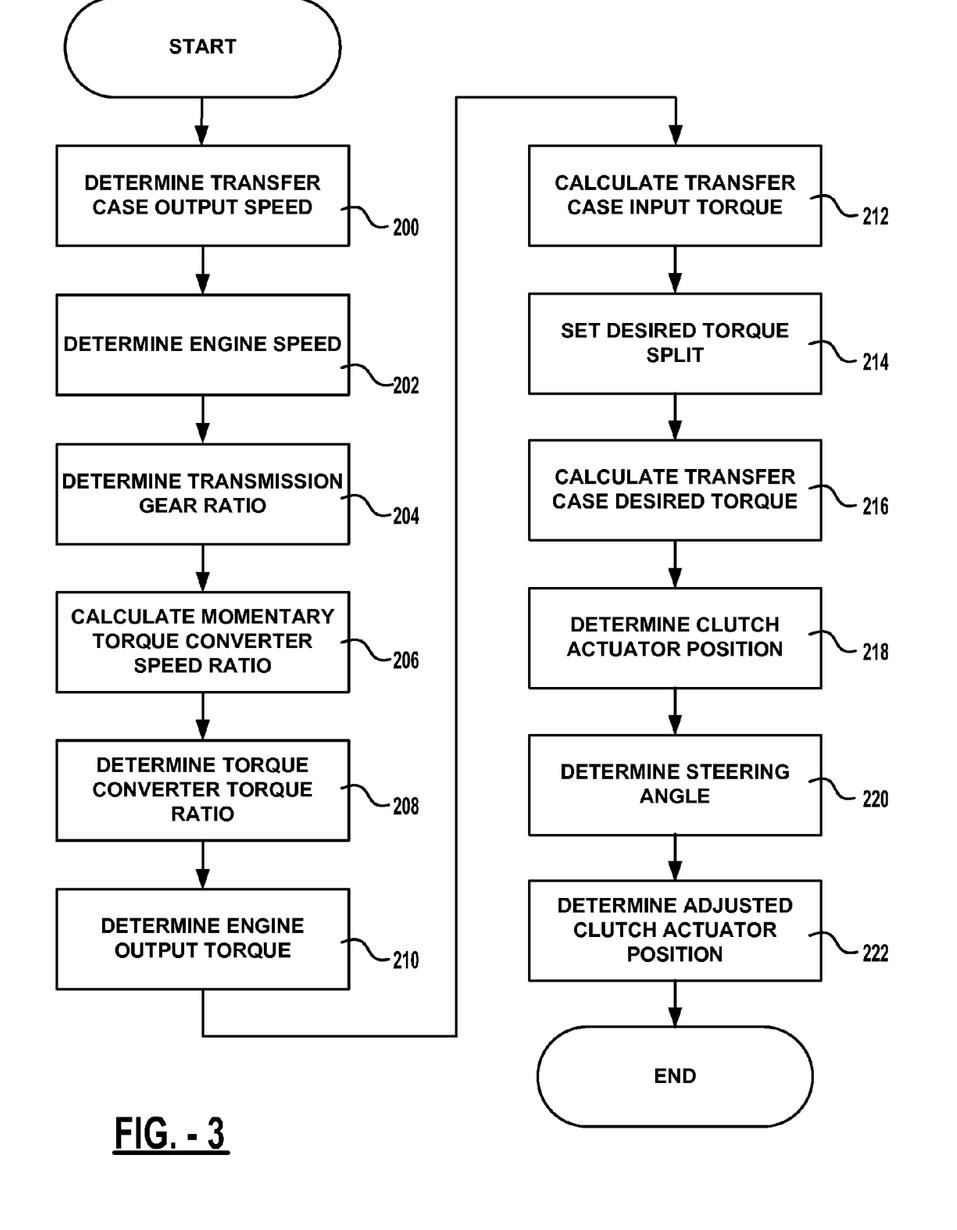
FIG. 3 is a flow chart illustrating steps performed by the control system of the present invention.

With particular reference to FIGS. 1 and 3, the active full-time torque control strategy of the present invention will now be described in greater detail. In essence, the control strategy includes a sequence of steps which function to prevent wheel slip while still providing drive torque to as many wheels as possible to help maintain vehicle traction and stability. In particular, controller 58 controls actuation of clutch actuator 52 in an attempt to simulate or "mimic" the operation of an interaxle differential by maintaining a desired torque split between the front and rear drivelines. As such, the control strategy of the present invention is advantageous over previous on-demand systems and full-time systems equipped with mechanical differentials in that slip need not be created for the power transfer system to transfer torque to the drivelines. Therefore, vehicle traction and stability is greatly improved.

To achieve the previously described advantages and functional attributes of the control strategy, drivetrain 10 is equipped with a variety of sensors that provide signals to controller 58. Specifically, an engine speed sensor 126 generates a signal based on the rotational speed of engine 18. An engine torque signal, shown schematically as sensor 128, is a signal calculated by the engine controller (not shown) that is indicative of the engine torque produced by engine 18. Likewise, a gear position signal, shown as sensor 130, is a signal from the transmission controller (not shown) indicative of the present gear in which transmission 20 is operating. A first speed sensor 132 generates a signal based on the rotational speed of rear output shaft 32 while a second speed sensor 134 generates a signal based on the rotational speed of front output shaft 42. In addition, a steering angle sensor 136 generates a signal based on the present steering angle of front wheels 34. Finally, a position sensor 138 generates a signal based on the linear or rotary position of a moveable component associated with transfer clutch 50 or clutch actuator 52 which is indicative of the current position of pressure plate 112 relative to clutch pack 104.

Figure 4:
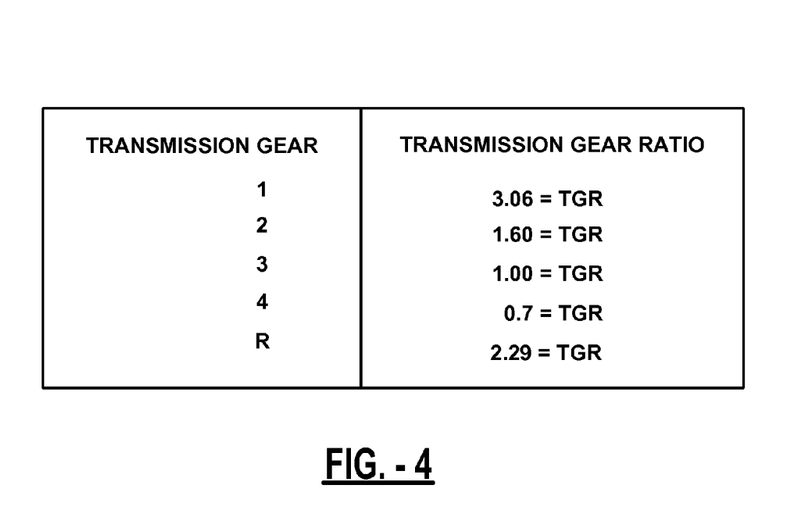
FIG. 4 is a look-up table correlating a transmission gear to a transmission gear ratio.

Referring to FIG. 3, the steps for the full-time torque control strategy of the present invention are shown. In step 200, first speed sensor 132 provides a signal indicative of transfer case output speed (TCOS). In step 202, engine speed sensor 126 provides a signal indicative of the rotational engine speed (ES). At step 204, gear position sensor 130 provides a signal indicative of the present gear in which transmission 20 is operating. A look-up table similar to the one shown in FIG. 4 is referenced to determine the transmission gear ratio (TGR). One skilled in the art will appreciate that the look-up table of FIG. 4 may be modified to represent the actual transmission gear ratios of any multi-speed transmission and that the four speed ratios provided in the table are merely exemplary.

At step 206, the value of a torque converter speed ratio (TCSR) is calculated using the following equation:

$$TCSR = TCOS/(ES/TGR)$$

For example, if the transfer case output speed is 300 RPM, the engine speed is 3000 RPM and the transmission is in first gear, the torque converter speed ratio is:

$$TCSR = (300 \text{ RPM})/(3000 \text{ RPM}/3.06)$$

$$TCSR = 0.306$$

Figure 5:
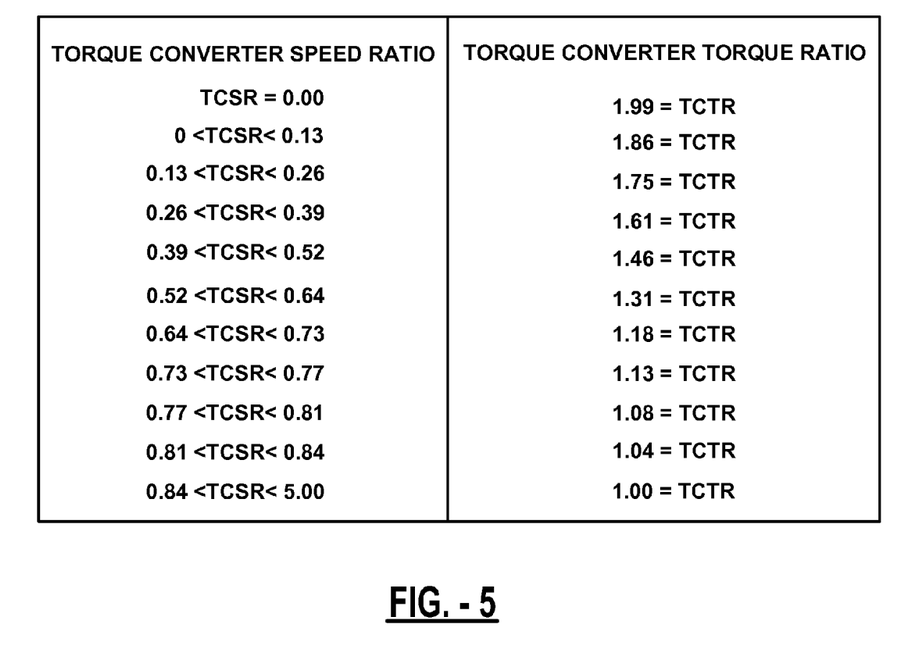
FIG. 5 is a look-up table correlating a torque converter speed ratio to a torque converter torque ratio.

At step 208, a torque converter torque ratio (TCTR) is determined by referring to a look-up table similar to the table shown in FIG. 5. Continuing to use the example based on a torque converter speed ratio (TCSR) of 0.306, a torque converter torque ratio (TCTR) of 1.61 is determined. As seen, the value of the torque converter speed ratio (TCSR) calculated in step 206 is used to select a corresponding value for the torque converter torque ratio (TCTR). The range of (TCSR) values assigned to each corresponding (TCTR) value is indicative of the slip speed between the rotary input and output members of the vehicle's torque converter. Based on the particular type of torque converter used, the (TCTR) value is, in turn, indicative of the torque multiplication generated across the torque converter. Obviously, the look-up values provided in FIG. 5 are merely exemplary and may be modified in accordance with each particular vehicle application.

At step 210, engine torque sensor 128 provides a signal indicative of the engine torque (ET) generated by engine 18. At step 212, the value of a transfer case input torque (TCIP) is calculated using the following equation:

$$TCIP = TCTR*ET*TGR$$

Assuming an engine torque of 200 lb-ft, and continuing use of the previous example, the value of the transfer case input torque (TCIP) is determined as follows:

$$TCIP = (1.61)*(200\ lb\text{-}ft)*(3.06)$$

$$TCIP = 985\ lb\text{-}ft$$

At step 214, a desired torque split percentage (TSP) value is selected to define the percentage of the total drive torque to be transferred through transfer clutch 50 to front driveline 14. In the example provided, a torque split of 40% to the front axle and 60% to the rear axle will be used. However, it should be appreciated that the desired torque split may be a preset value as indicated or may be a dynamic value which is varied during vehicle operation based on detected operating characteristics.

At step 216, a value for a transfer case desired torque (TCDT) is calculated by using the following equation:

$$TCDT = TCIP*TSP$$

$$TCDT = (985\ lb\text{-}ft)*40\%$$

$$TCDT = 395\ lb\text{-}ft$$

Once a transfer case desired torque (TCDT) value has been calculated, a clutch actuator position (CAP) is determined at step 218. To this end, the torque transmission characteristics of friction clutch assembly 90 are correlated to the position of a moveable component of clutch actuator 52 in a look-up table similar to the table provided in FIG. 6. The first column provides a predetermined number of value ranges for the transfer case desired torque (TCDT) to be generated by engagement of transfer clutch 50. For each of these ranges, a corresponding clutch actuator position (CAP) is assigned in the second column. Each clutch actuator position (CAP) value is an integer that is indicative of an incremental change in the position of pressure plate 112 relative to clutch pack 104 that is required to transfer the "target" torque value (TCDT) to front output shaft 42 so as to maintain the desired 40/60 torque split. In this regard, the (TCDP) value of 0 is indicative of pressure plate 112 being located in its locked position for fully engaging transfer clutch 50. Therefore, each sequential (CAP) value (i.e., 0-10) indicates an incremental amount of travel that pressure plate 112 is offset or retracted from its locked position in a direction toward its released position. In the example shown, a transfer case desired torque (TCDT) of 395 lb-ft corresponds to a clutch actuator position (CAP) of five.

Figure 6:
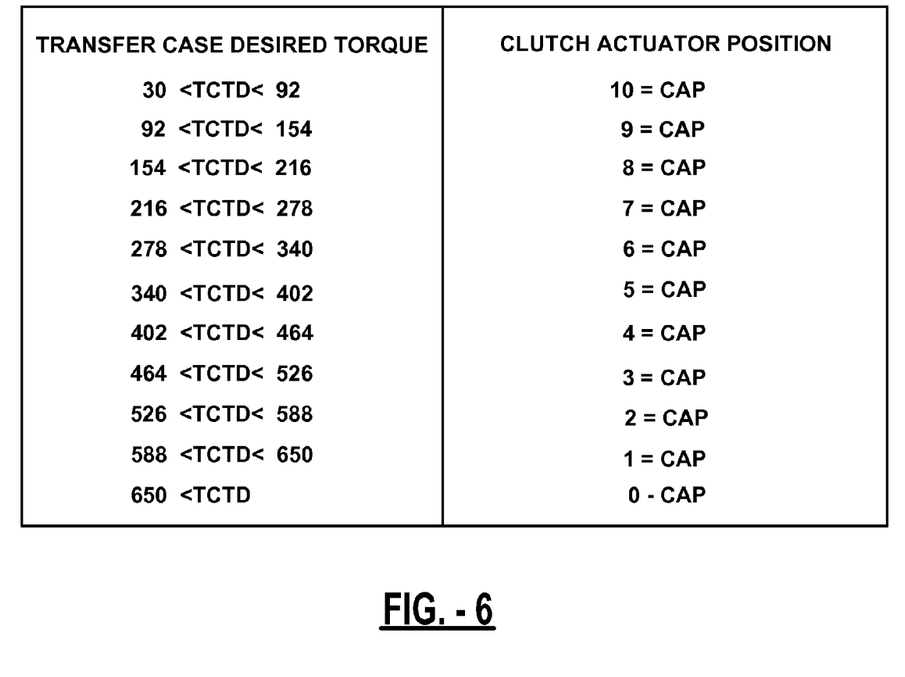
FIG. 6 is a look-up table correlating a desired torque value to a clutch actuator position.

The look-up table in FIG. 6 depicts eleven different positions for maintaining the desired torque split between the front and rear drivelines. Obviously, skilled artisans will understand that the specific number of discrete positional increments actually used can be varied to accommodate the torque transfer and clutch apply characteristics for each particular four-wheel drive application. As feedback to assist in precisely positioning pressure plate 112 to achieve the targeted torque transfer, a signal from position sensor 138 is used by controller 58 to identify the actual position and make any fine adjustments required, such as for wear anticipated after prolonged service.

Figure 7:
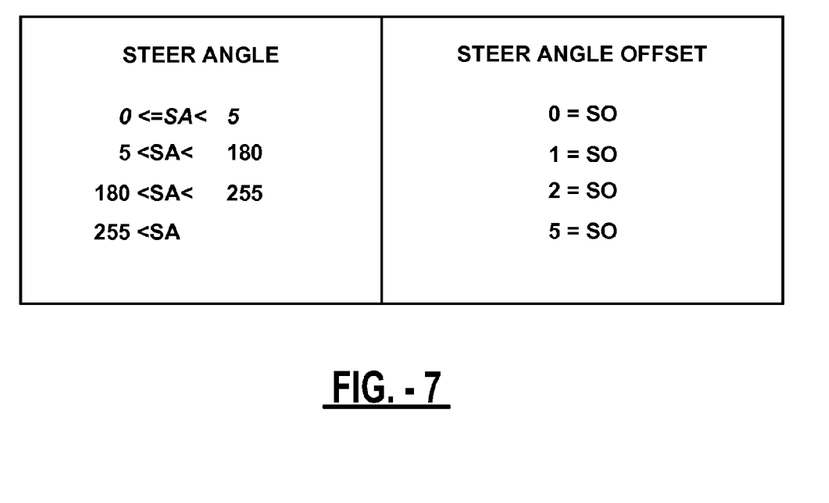
FIG. 7 is a look-up table correlating a steering angle value to a clutch actuator position offset value.

To further enhance vehicle stability, steering angle sensor 136 provides a signal indicative of the steering angle to controller 58 at step 220. If the vehicle is turning, and the vehicle speed is below a maximum threshold value (i.e., 20 mph), the value of the transfer case desired torque (TCDT) previously determined in step 216 will be reduced to avoid binding and/or front drive wheel slip. To this end, FIG. 7 depicts an apply look-up table which correlates steering angle to a positional offset value. In essence, if the vehicle is operating at low speed and the operator attempts to make a tight (high angle) turn, then the clutch actuator position (CAP) value determined in step 218 is adjusted to reduce the drive torque transmitted to front driveline 14. Given a steering angle of 200 degrees, the look-up table depicts a steering angle offset (SO) value equal to 2.

At step 222, the adjusted clutch actuator position (ACAP) is determined using the following equation.

$$ACAP = CAP + SO$$

$$ACAP = 5 + 2$$

$$ACAP = 7$$

Thus, the targeted amount of drive torque to be transmitted through transfer clutch 50 during such a low-speed high angle turn would be equal to the (TCDT) value corresponding to the 7th clutch actuator position (CAP), as shown in the look-up table of FIG. 6.

The previously described strategy may be continuously implemented during vehicle operation or selectively invoked by the operator via shifting mode selector 56 between the available mode positions. Once the control strategy is functioning, steps 200-222 are executed frequently to actively control the torque output of front wheels 34 and rear wheels 24 in an attempt to maximize vehicle stability and control.

While the control strategy of the present invention has been described in relation to a driveline as depicted in FIG. 1, alternate embodiments are contemplated. In its most broad form, the control strategy of the present invention may be implemented to control virtually any power transmission device within a vehicle in which the output torque may be controlled. Moreover, FIGS. 8-14 depict specific embodiments which have been contemplated.

Figure 8:
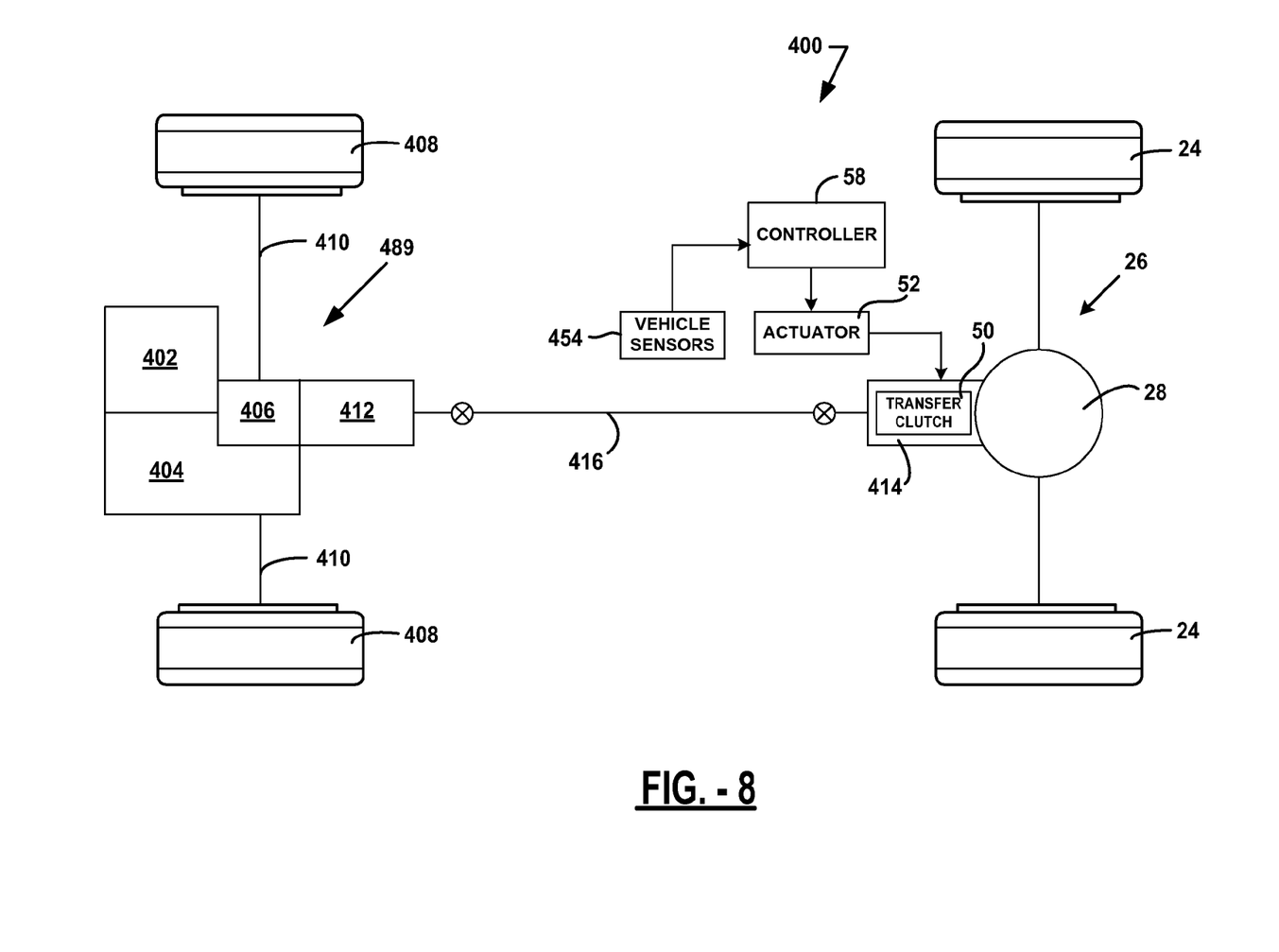
FIG. 8 is a schematic illustration of an alternative driveline for a four-wheel drive motor vehicle equipped with a power transmission device of the present invention.

To illustrate an alternative power transmission device to which the present invention is applicable, FIG. 8 schematically depicts a front-wheel based four-wheel drivetrain layout 400 for a motor vehicle. In particular, engine 402 drives a multi-speed transmission 404 having an integrated front differential unit 406 for driving front wheels 34 via axle shafts 410. A power transfer unit 412 is also driven by transmission 404 for delivering drive torque to the input member of a torque transfer coupling 414 via a drive shaft 416. In particular, the input member of transfer coupling 414 is coupled to drive shaft 416 while its output member is coupled to a drive component of rear differential 28. Accordingly, controller 58 adaptively controls actuation of torque coupling 414 such that drive torque is delivered in proper proportion to rear wheels 24. It is contemplated that torque transfer coupling 414 would include a multi-plate transfer clutch 50 and a clutch actuator 52 that are generally similar in structure and function to that of any of the devices previously described herein. While shown in association with rear differential 28, it is contemplated that torque coupling 414 could also be operably located for transferring drive torque from transfer unit 412 to drive shaft 416.

Figure 9:
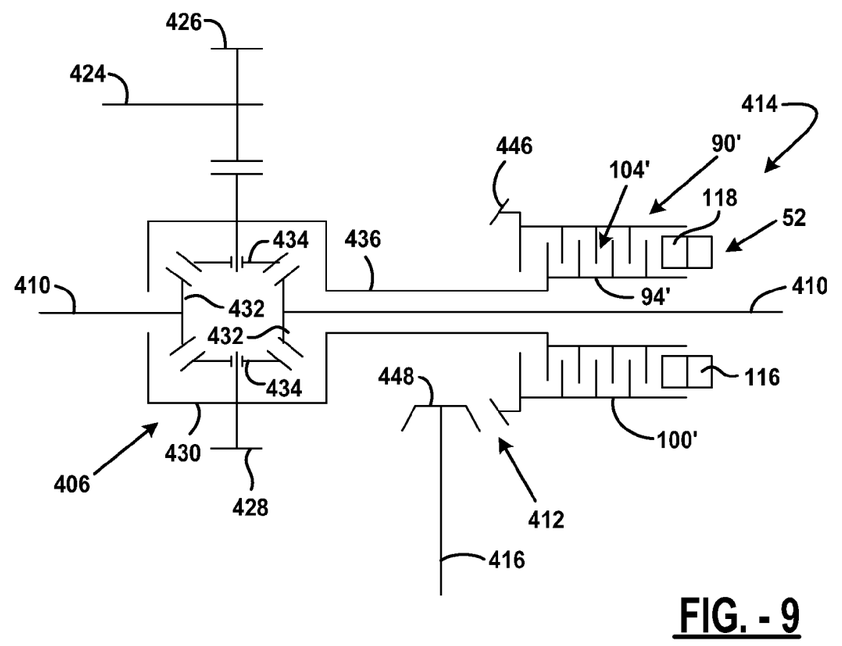
FIGS. 9 through 10 are schematic views of additional embodiments of power transmission devices equipped with the torque transfer mechanism of the present invention.

Referring now to FIG. 9, torque coupling 414 is schematically illustrated in association with a four-wheel drive system based on a front-wheel drive vehicle similar to that shown in FIG. 8. In particular, an output shaft 424 of transmission 404 is shown to drive an output gear 426 which, in turn, drives an input gear 428 fixed to a carrier 430 associated with front differential unit 406. To provide drive torque to front wheels 34, front differential unit 406 includes a pair of side gears 432 that are connected to front wheels 34 via axleshafts 410. Differential unit 406 also includes pinions 434 that are rotatably supported on pinion shafts fixed to carrier 430 and which are meshed with side gears 432. A transfer shaft 436 is provided to transfer drive torque from carrier 430 to a clutch hub 94' associated with multi-pate clutch assembly 90'. Clutch assembly 90' further includes a drum 100' and a clutch pack 104' having interleaved clutch plates operably connected between hub 94' and drum 100'.

Transfer unit 412 is a right-angled drive mechanism including a ring gear 446 fixed for rotation with drum 100' of clutch assembly 90' which is meshed with a pinion gear 448 fixed for rotation with drive shaft 416. As seen, a clutch actuator 52 is schematically illustrated for controlling actuation of clutch assembly 90'.

Figure 10:
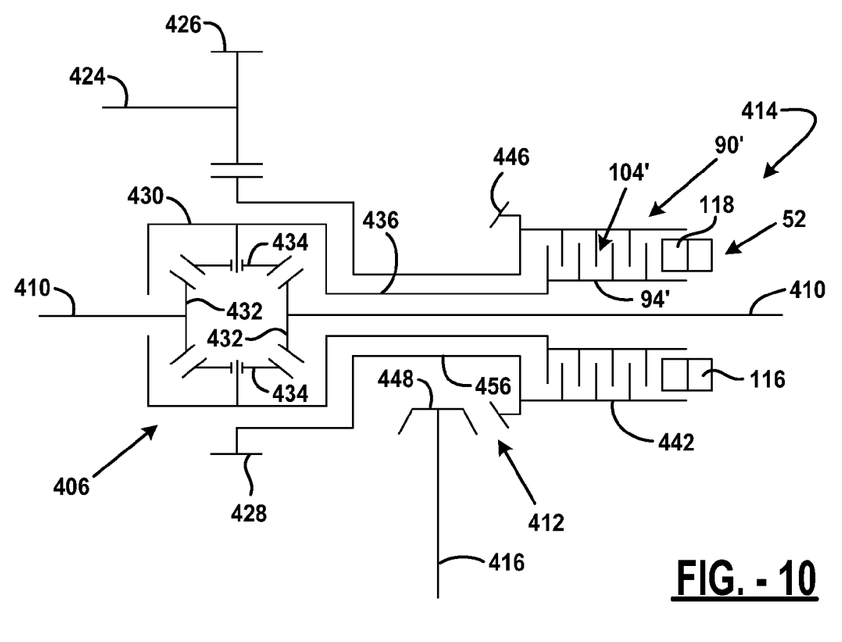

FIG. 10 illustrates a modified version of FIG. 9 wherein an on-demand four-wheel drive system is shown based on a rear-wheel drive motor vehicle that is arranged to normally deliver drive torque to rear wheels 24 while selectively transmitting drive torque to front wheels 34 through torque coupling 414. In this arrangement, drive torque is transmitted directly from transmission output shaft 424 to transfer unit 412 via a drive shaft 456 interconnecting input gear 428 to ring gear 446. To provide drive torque to front wheels 34, torque coupling 414 is now shown operably disposed between drive shaft 456 and transfer shaft 436. In particular, clutch assembly 90' is arranged such that drum 100' is driven with ring gear 446 by drive shaft 456. As such, actuation of clutch actuator 52 functions to transfer torque from drum 100' through clutch pack 104' to hub 94' which, in turn, drives carrier 430 of front differential unit 406 via transfer shaft 436. Accordingly, continuous adaptive traction control is provided.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device for use in a motor vehicle having a powertrain and first and second drivelines for transferring torque to vehicle wheels, comprising:

a first rotary member operable for transferring drive torque from the powertrain to the first driveline;
a second rotary member driving the second driveline;
a multi-plate friction clutch operably disposed between said first and second rotary members;
a clutch operator for applying a clutch engagement force on said friction clutch so as to transfer drive torque from said first rotary member to said second rotary member;
a clutch actuator operable to control movement of said clutch operator relative to said friction clutch in response to a control signal; and
a control system for generating said control signal and causing said clutch actuator to move said clutch operator to a predetermined position corresponding to a desired torque value that is transferred across said friction clutch prior to wheel slip, said desired torque value being a function of an input torque value applied to said first rotary member, and wherein said input torque value is determined as a function of a torque converter torque ratio, an engine torque value and a transmission gear ratio.

2. The power transmission device of claim 1 wherein said torque converter torque ratio is a function of a torque converter speed ratio determined by said control system.

3. The power transmission device of claim 2 wherein said torque converter speed ratio is a function of an engine speed value, said transmission gear ratio and rotary speed value of said second rotary member.

4. A method of controlling torque transfer between first and second rotary members across a friction clutch within a torque transfer coupling of a motor vehicle, the method comprising the steps of:

determining a torque converter speed ratio;
determining a torque converter torque ratio based on said torque converter speed ratio;
determining an input torque value transmitted to the first rotary member;
determining a desired output torque value to be transmitted across the friction clutch from the first rotary member to the second rotary member based on said torque converter torque ratio and said input torque value; and
selectively actuating the friction clutch in one of at least two modes without regard to a relative speed difference between the first and second rotary members, wherein a two-wheel drive mode maintains the friction clutch in a non-engaged condition and a four-wheel drive mode regulates engagement of the friction clutch for transferring said desired output torque value to the second rotary member.

5. The method of claim 4 wherein the step of determining said torque converter speed ratio includes:

determining an engine speed value of an engine;
determining a current transmission gear ratio of a transmission disposed between said engine and the first rotary member; and
determining a rotary speed value of the second rotary member.

6. The method of claim 5 wherein said step of determining said input torque includes determining an engine torque value of said engine.

7. The power transmission device of claim 1 further including a sensor operable to provide said control system a signal indicative of the position of said clutch operator.

8. The power transmission of claim 7 wherein said control system modifies a correlation between said clutch operator position and said torque transferred by said friction clutch to account for clutch wear.

9. The power transmission of claim 1 wherein said control system is operable to generate said control signal and said friction clutch transfers said desired torque value irrespective of the magnitude of relative rotation between the first and second rotary members.

10. A method of controlling torque transfer between first and second rotary members across a friction clutch within a torque transfer coupling of a motor vehicle, the method comprising the steps of:
  determining a vehicle speed;
  determining a steering angle;
  determining a torque converter speed ratio;
  determining a desired output torque to be transmitted across the friction clutch from the first rotary member to the second rotary member based on said vehicle speed, said torque converter speed ratio and said steering angle, wherein said desired output torque is decreased as said steering angle increases; and
  selectively actuating the friction clutch, prior to a vehicle wheel slip, in one of at least two modes wherein a two-wheel drive mode maintains the friction clutch in a non-engaged condition and a four-wheel drive mode regulates engagement of the friction clutch for transferring said desired output torque value to the second rotary member.

* * * * *